United States Patent
Carter et al.

(10) Patent No.: US 6,421,356 B2
(45) Date of Patent: *Jul. 16, 2002

(54) METHOD AND APPARATUS FOR BANDWIDTH MANAGEMENT IN A DIGITAL LOOP CARRIER SYSTEM

(75) Inventors: Dan Kesner Carter, Broken Arrow; Perry Joe Brown, Tulsa; Brian Christian Smith, Broken Arrow, all of OK (US)

(73) Assignee: Telstrat International, Plano, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/134,130
(22) Filed: Aug. 14, 1998
(51) Int. Cl.[7] .................................................. H04J 3/02
(52) U.S. Cl. ...................... 370/468; 370/477; 370/485
(58) Field of Search ............................ 370/249, 419, 370/420, 458, 468, 485, 493, 477, 437, 443; 379/27, 93.03, 100.03, 100.04, 100.05, 114, 120, 243

(56) References Cited

U.S. PATENT DOCUMENTS 5,610,910 A * 3/1997 Focsaneanu et al. ........ 370/401
5,682,385 A * 10/1997 Garcia et al. ............... 370/458

* cited by examiner

Primary Examiner—Wellington Chin
Assistant Examiner—Frank Duong
(74) Attorney, Agent, or Firm—Schwegman, Lundberg, Woessner & Kluth, P.A.

(57) ABSTRACT

A method and apparatus are provided for managing bandwidth operative in a digital loop carrier system. The system includes service cards connectable to at least one transport card having a given bandwidth capacity. Each of the service cards supports multiple subscriber channels. Upon initiation of a first call, the system allocates the call to a given time slot of the transport card. The given time slot is assigned a given default bandwidth, e.g., 64 kbps. While the first call is in progress, the system determines whether the call is voice or data. If the first call is voice, the system may selectively reduce the given default bandwidth allocated to the first call if necessary to ensure that a second call, if initiated while the first call remains in progress, can be assigned the given default bandwidth.

20 Claims, 8 Drawing Sheets

METHOD AND APPARATUS FOR BANDWIDTH MANAGEMENT IN A DIGITAL LOOP CARRIER SYSTEM

BACKGROUND OF THE INVENTION

1. Technical Field

The present invention relates generally to digital loop carrier (DLC) systems and, more particularly, to bandwidth management in DLC systems.

2. Description of the Related Art

DLC systems have been an important part of local exchange carrier line deployment for over 15 years. They reduce the copper cabling used in local loops, which comprise the physical connection between a subscriber's premises and the telecommunications network provider. A DLC system consolidates multiple individual subscriber telephone lines into one or more copper or fiber carrier lines extending from the subscriber area to the network provider central office (CO). DLC systems thereby enable network providers to leverage investments in copper cable in the field by allowing it to transport more subscribers in larger geographic areas.

It has become increasingly important to scale networks to higher speed technologies such as, e.g., digital subscriber line (xDSL) technology, integrated synchronous digital network (ISDN) and other services. These technologies allow data to be transmitted over standard copper cable at speeds of several megabits of data per second. Many factors are driving the need for faster transport capabilities, the most significant of which is increased Internet usage by subscribers.

The resulting increased network traffic has caused bottlenecking in existing DLC systems because of the finite bandwidth capacity of the carrier line infrastructure leading to the CO. A tremendous need thus exists for increasing the capacity and flexibility of existing carrier line infrastructure.

A known method for increasing available bandwidth in existing communication networks comprises compressing all loop traffic (namely, both voice frequency and data) using compression techniques such as adaptive pulse code modulation (ADPCM) and other compression algorithms. While voice signals can generally be compressed without significant degradation, compression has a detrimental effect on the quality and bit rate of data transmission. Consequently, compression techniques are not widely used in loop systems.

BRIEF SUMMARY OF THE INVENTION

A primary object of the invention is to provide a method and apparatus for intelligently managing bandwidth in a DLC system by identifying and selectively compressing signals that can be compressed without significant degradation.

Another object of the invention is to provide a bandwidth management scheme for a DLC system that ensures each new call of getting at least a given default bandwidth when initiated.

An additional object of the invention is to provide a method and apparatus for optimizing bandwidth usage in a DLC system with the surplus bandwidth being made available for broadband transmission and other services.

Yet another object of the invention is to provide a system including central and remote terminals having advanced bandwidth management capability that furnish higher channel capacity in less space, and that are easy to install, use and maintain.

A further object of the invention is to provide a DLC system with a sophisticated bandwidth management scheme that supports multiple telecommunications services, including plain old telephone service (POTS), coin, digital, broadband, ISDN, frame relay, ATM and other services.

Still another object of the invention is to provide a method and apparatus for collecting data on system usage to facilitate network planning and costing.

These and other objects are accomplished by a method and apparatus for managing bandwidth in a DLC system. In a preferred embodiment, the system includes service cards connectable to at least one transport card having a given bandwidth capacity. Each of the service cards supports multiple subscriber channels. Upon initiation of a first call, the system allocates the call to a given time slot of the transport card. The given time slot is assigned a given default bandwidth, e.g., 64 kbps. While the first call is in progress, the system determines whether the call is voice or data (e.g., modem). If the first call is voice, the system may selectively reduce the given default bandwidth allocated to the first call if necessary to ensure that a second call, if initiated while the first call remains in progress, can be assigned the given default bandwidth. Thus, according to the inventive bandwidth management scheme, each new call is ensured of getting at least the default bandwidth when initiated.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings, in which.

DETAILED DESCRIPTION OF THE PREFERRED EMBODIMENT

Figure 1:
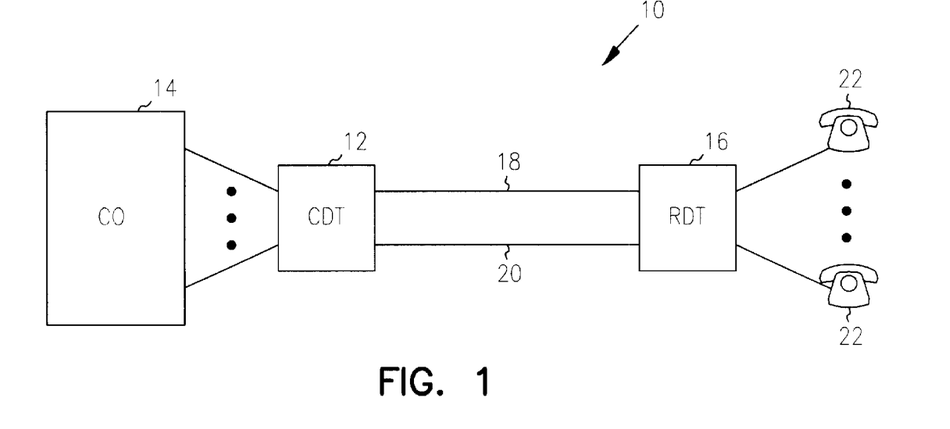
FIG. 1 is a schematic block diagram illustrating a DLC system in accordance with the invention.

FIG. 1 illustrates a DLC system 10 according to the present invention. Certain aspects and features of the inventive bandwidth management solution used in the system may be implemented in network architectures other than DLCs. However, for convenience of illustration, the invention is described in the context of a DLC system.

The system 10 preferably includes a Central Digital Terminal (CDT) 12, which is located at the CO 14 (i.e., local exchange switch), and a Remote Digital Terminal (RDT) 16, which is located near subscribers. The CDT 12 and the RDT 16 are connected by one or more media 18, 20 such as carrier lines (e.g., copper, coaxial cable, and optical fiber lines) and wireless media.

The RDT 16 generally serves as a multiple line network node providing services to multiple subscribers 22. Both digital and analog services can be provided including POTS, coin, broadband, ISDN, frame relay, ATM, universal voice grade (UVG), and other services.

The DLC system shown in FIG. 1 is a point-to-point system. It should be noted, however, that the invention can be implemented in a variety of network topologies including star, ring, drop and insert, and star from remote terminals topologies or some combination thereof.

Figure 2:
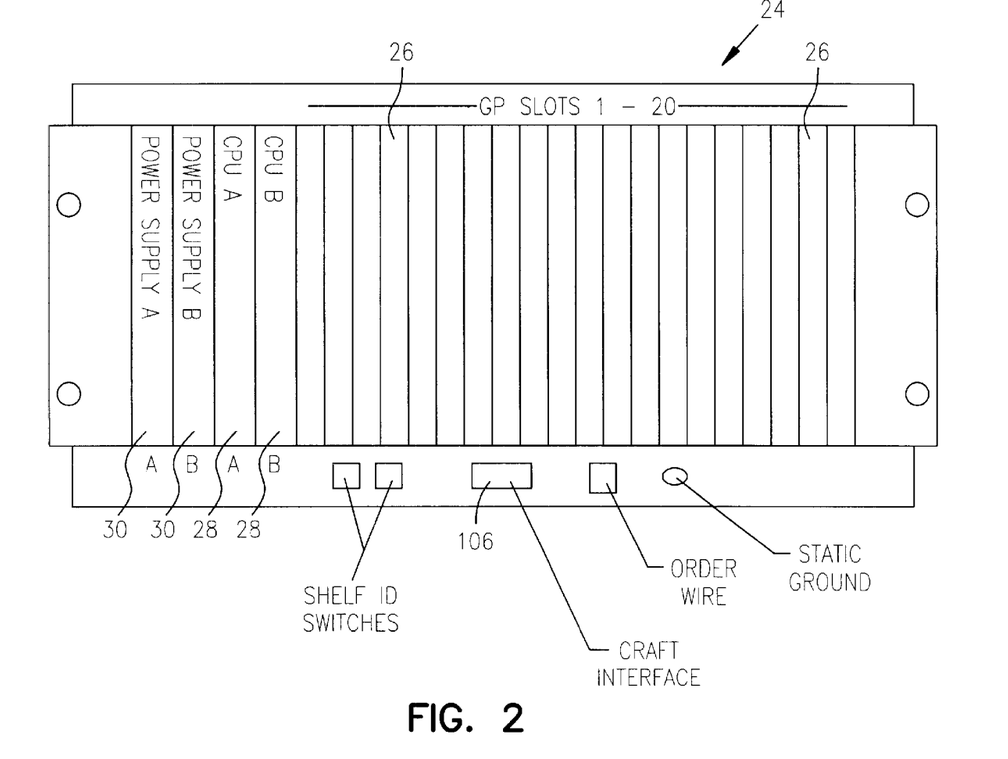
FIG. 2 is a front view of a Central Digital Terminal (CDT) of the DLC system in accordance with the invention.

The CDT and RDT units preferably are functionally similar, each preferably comprising a channel bank assembly, an example of which (for the CDT) is shown in FIG. 2. The CDT channel bank assembly 24 has a plurality of slots 26 for receiving various operating cards. (The RDT typically includes fewer slots since the CDT typically serves more than one RDT.) The slots 26 include preferably two Central Processing Unit (CPU) slots (for redundancy) for receiving CPU cards 28, two power supply slots (also for redundancy) for receiving power supply cards 30, and multiple general purpose slots. The general purpose slots are equipped with various service cards (e.g., POTS cards) and so-called transport cards for providing phone and data services to customers.

The unit 24 preferably has inter-shelf connectivity through a backplane; it can be easily expanded by linking additional channel bank assemblies to a primary shelf by means of a fiber optic cable (not shown) in a daisy-chain formation.

Figure 3:
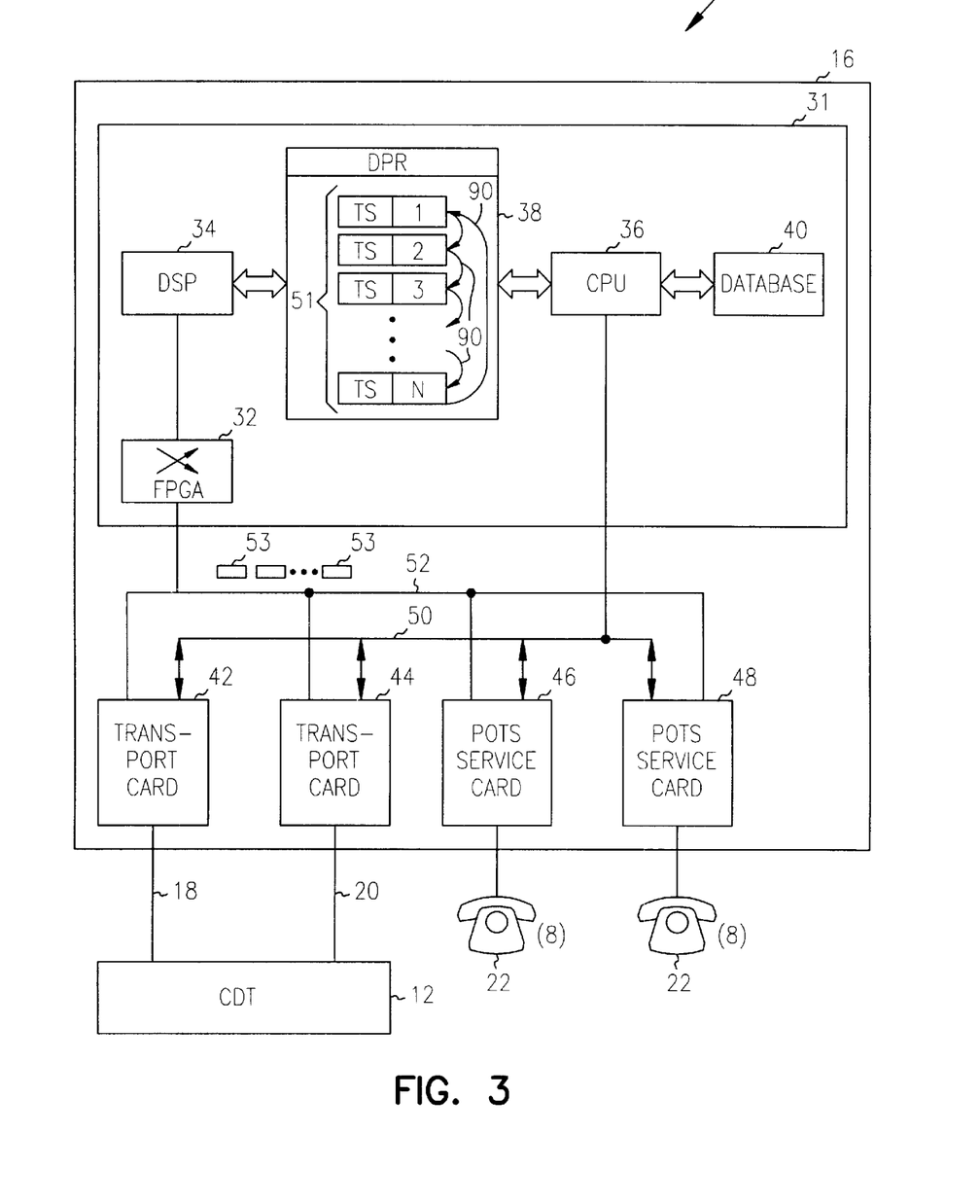
FIG. 3 is a schematic block diagram illustrating functional components of a Remote Digital Terminal (RDT) in accordance with the invention.
Figure 4:
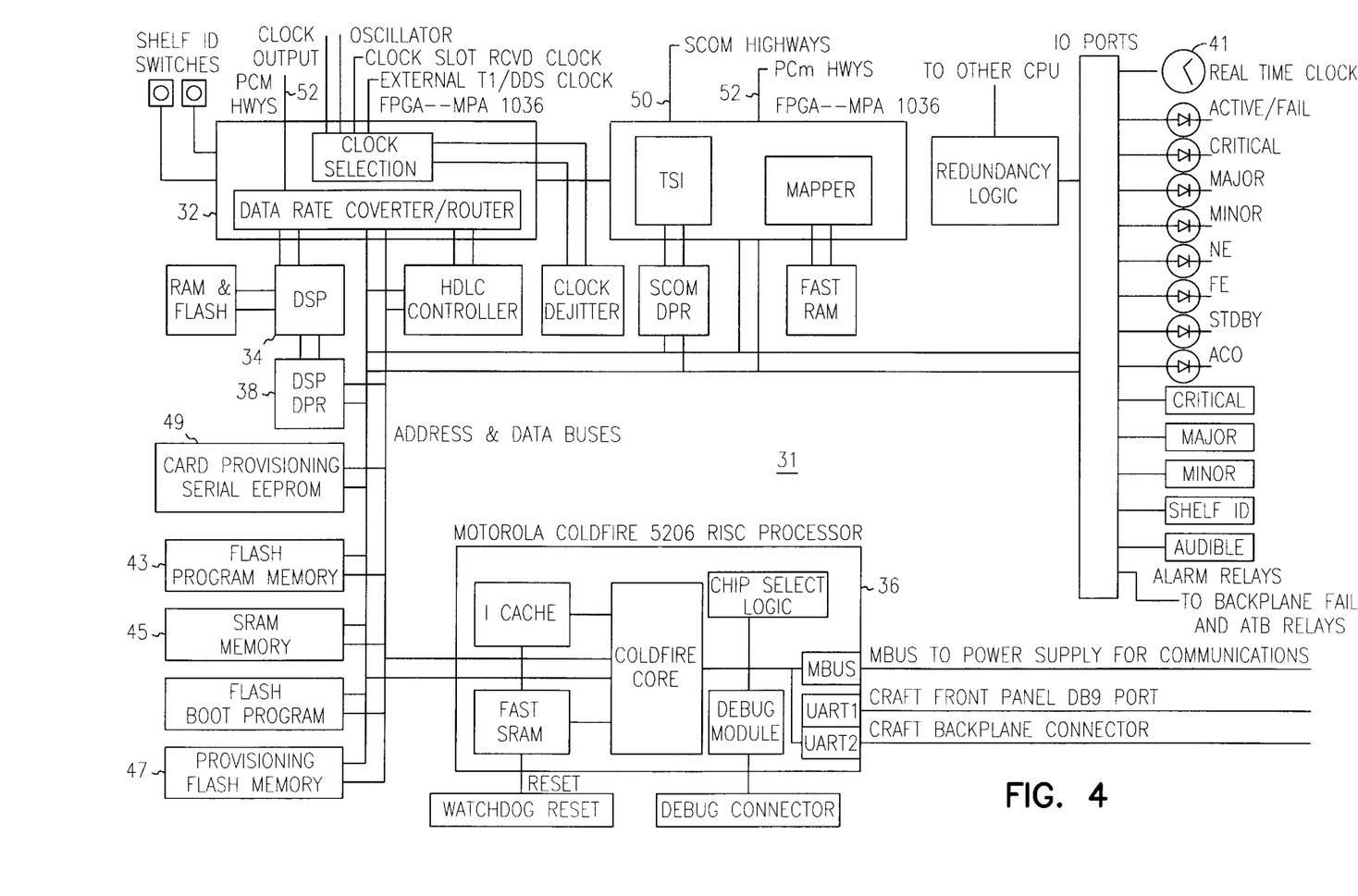
FIG. 4 is a schematic block diagram illustrating in greater detail the functional components of the CPU card of the RDT.

FIG. 3 illustrates in general the operation of the RDT 16. The RDT 16 includes a CPU card 31, a more detailed block diagram of which is shown in FIG. 4. The CPU card 31 is designed for system wide control. It provides bandwidth management and control, alarm management, maintenance and testing, timing generation, and system provisioning.

The CPU card 31 includes a Field Programmable Gate Array (FPGA) 32, a digital signal processor (DSP) 34, a CPU 36, a dual port random access memory (DSR) 38, which interfaces the CPU 36 to the DSP 34, and a database 40. The CPU card 31 also includes a low power real time clock 41 for time stamping alarms and system activities.

The CPU 36 is the controlling element of each shelf. The CPU 36 is preferably designed to operate in either stand-alone or redundant configurations. In the embodiment described herein, the CPU 36 preferably comprises a Motorola MCF5206 Coldfire processor. It should be noted, however, that a variety of other processors capable of performing the functions described herein can alternatively be used. The 5206 processor runs on a 16 bit bus with 16 bit program and data memory spaces defined. The architecture provides dynamic bus sizing options to provide support for 8 bit peripherals. The architecture is based on a Reduced Instruction Set Computing (RISC) core that provides extremely efficient, high speed operation.

The CPU 36 is preferably supported by various memory units. A 32 Megabyte (1.5 M×16) flash memory 43 is provided for program storage. A 16 Megabyte (1 M×16) SRAM memory 45 is provided for storage of program data. A 4 Megabyte (512 k×8) flash memory 47 is provided for configuration and provisioning. A serial EEPROM 49 is also provided for card provisioning.

The CPU 36 controls traffic based on information received from the DSP 34. It also controls a linked list 51 in the DPR 38, which contains information including data on time slot allocation, by adding and removing items from the list.

The FPGA 32 provides access to the DSP 34. The FPGA 32 can be remotely modified to change system hardware as desired.

Among other functions, the DSP 34 samples and analyzes traffic to determine if traffic in a particular time slot is voice or data using an algorithm described below. After analyzing the time slot, the DSP 34 updates the DPR linked list 51 with its last evaluation of the sample it took.

The database 40 contains current and historical traffic information for use in network planning and operation, as will be described below.

The RDT 16 also includes one or more transport cards 42, 44 (two transport cards are shown in FIG. 3) connected to one or more service cards 46, 48 (two POTS service cards are shown). There are "n" service cards per transport card. A systems communications bus 50 connects each of the cards and CPU 36 for carrying control signals. The bus 50 is a time division multiplex (TDM) bus. A pulse code modulation (PCM) bus 52 connects the service cards 46, 48 and the transport cards 42, 44 for traffic flow.

The service cards 46, 48 shown each provide POTS service to a plurality of subscribers 22. For example, the POTS service cards 46, 48 can contain eight channels servicing eight subscribers. Though not shown, the system can include a variety of other service cards providing other services such as coin, digital, broadband, ISDN, frame relay, ATM, UVG and other services.

The transport cards 42, 44 of the RDT 16 are connected to corresponding transport cards (not shown) in the CDT 12 by various media (e.g., carrier lines and wireless media). The transport cards provide a high speed link between the RDT 16 and the CDT 12. In the FIG. 3 system, one set of transport cards is connected by an optical fiber line 18, and the other set of transport cards 44 is connected by copper cabling 20 supporting one of a variety of protocols including ISDN, MDSL, HDSL, ADSL, and T1, which have varying bandwidth capacities. The bandwidth can be divided into time slots 53 having a given bandwidth, e.g., 64 kbps, 32 kbps or 16 kbps.

Figure 5:
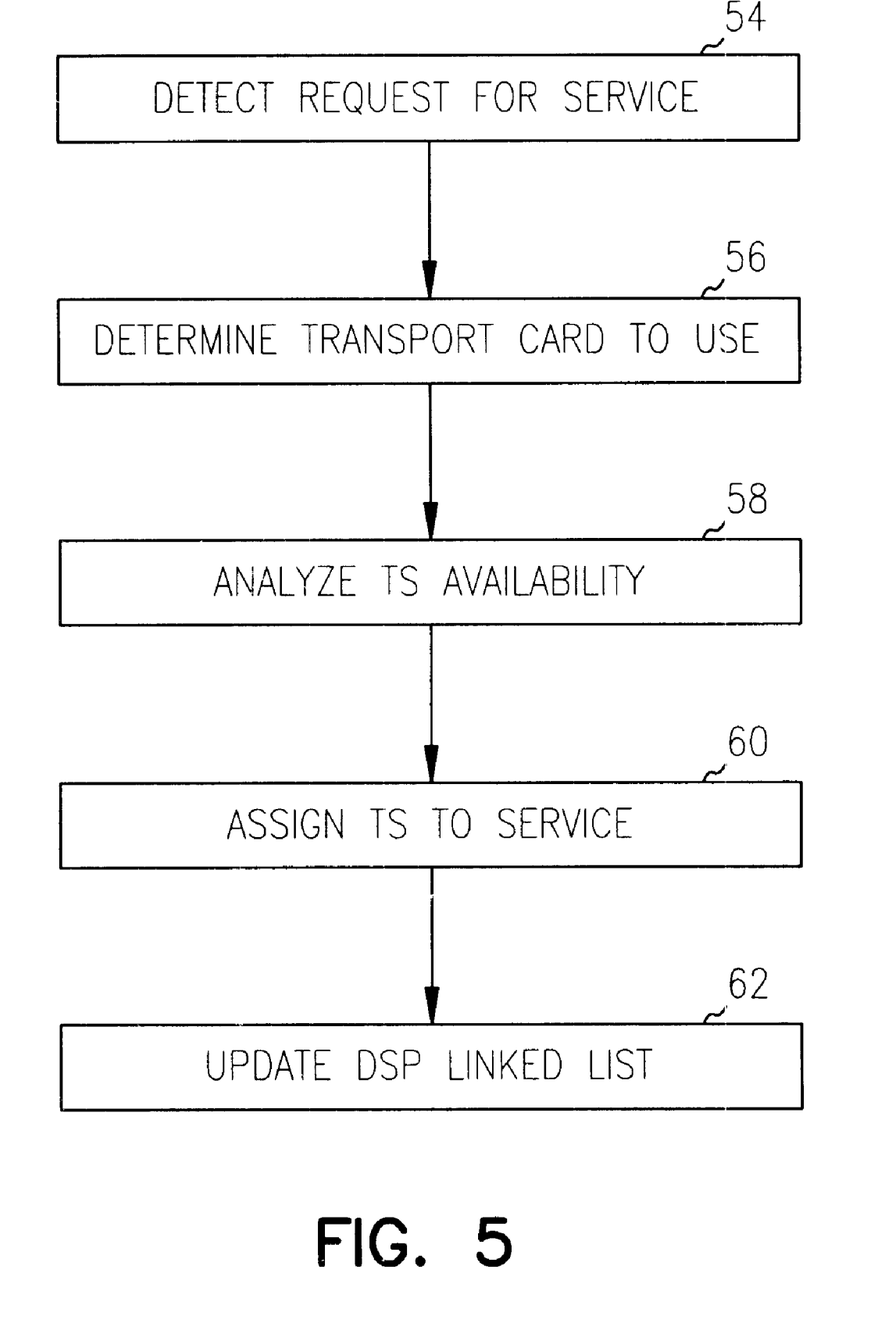
FIG. 5 is a flowchart illustrating operation of the RDT to allocate a time slot for a call.

FIG. 5 is a flow chart illustrating CPU-controlled operation of the RDT 16. Initially at step 54, one of the service cards 46, 48, which are interrupt driven, detects a request for service from one of the subscribers 22, i.e., an off-hook condition. The CPU 36 then determines what transport card to use at step 56 based on the level of service pre-selected by the subscriber 22. Next, time slot availability for the transport card is analyzed at step 58. A time slot is then assigned to the service having a given default bandwidth, preferably 64 kbps, at step 60. The linked list 51 in the DPR 38 is then updated with information on this call.

It is preferred, though not required, to allocate bandwidth on a transport card basis. Bandwidth can alternatively be allocated on a service card basis.

Figure 6:
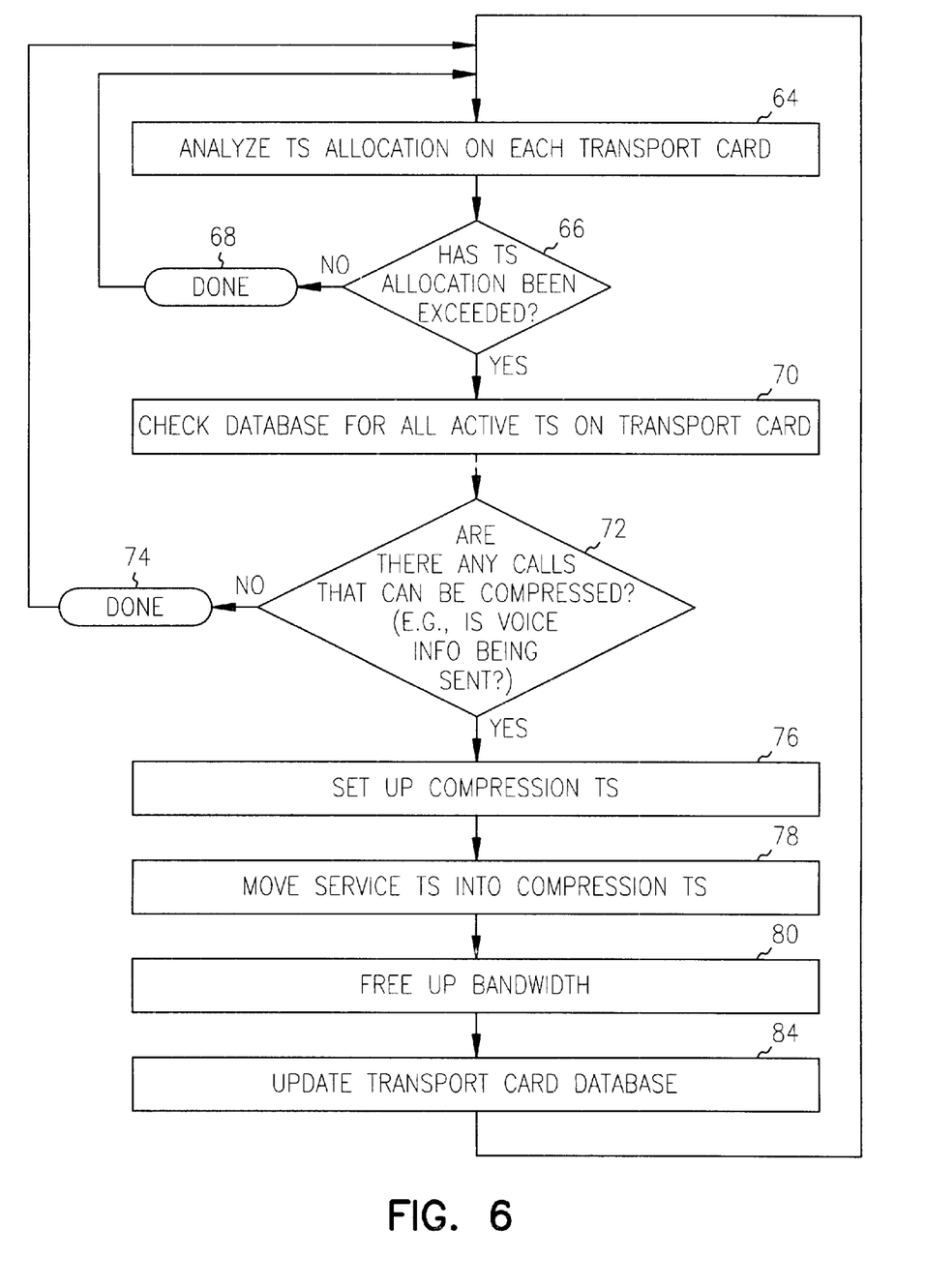
FIG. 6 is a flowchart illustrating operation of the RDT to selectively compress a call.

As shown in FIG. 6, while the call is in progress, the DSP 34 analyzes the system periodically, e.g., at every second.

First, at steps 64, 66, the time slot allocation in each transport card is analyzed to determine whether a preset threshold value relating to the transport card capacity has been exceeded. If not, the analysis for this period ends at 68. If the threshold has been exceeded, the database 40 is inspected at 70 to analyze all active time slots on the transport card. Then at step 72, the DSP uses an algorithm to determine whether there are any active calls that can be compressed without significant degradation (e.g., primarily voice, but optionally low speed data traffic). If such calls are found, they are further analyzed to determine whether the system is authorized to compress any of these calls. (Subscribers can be given the option to have none of their calls compressed including those that can be compressed without significant degradation. In other words, each subscriber channel can be provisioned to be locked at a given bandwidth or level of service if desired.) If no calls can be compressed, the DSP analysis for this period ends at 74. If the DSP determines that a call can be compressed, a compression time slot having a reduced bandwidth (e.g., 32 kbps) is set up at 76, and the service time slot (i.e., the one currently hosting the compressible call) is moved on the fly to the compression time slot. Bandwidth on the service time slot is thus freed up for usage at step 80. The linked list 51 in the DPR 38 is then updated at step 84 to indicate the time slot change.

Upon reallocation of the time slot, the CPU 36 notifies the corresponding POTS service card in the CDT 12 that the signal is to be received on the new time slot.

There is no service interruption during the time slot transfer because the signal will be transmitted on two time slots (at the default bandwidth and at the compressed bandwidth) during setup of the compression time slot. The CPU instructs the POTS card to multicast the call on the two time slots until the compression algorithm is equalized. Thereafter, transmission on the default bandwidth time slot is stopped and the time slot is released. Users thereby avoid hearing noise during time slot transfer.

The circuitry for performing the compression is located on the transport cards, although this is not required. Such circuitry could optionally be implemented in firmware and software, or on the service card, or centrally located elsewhere in the shelf.

Figure 7:
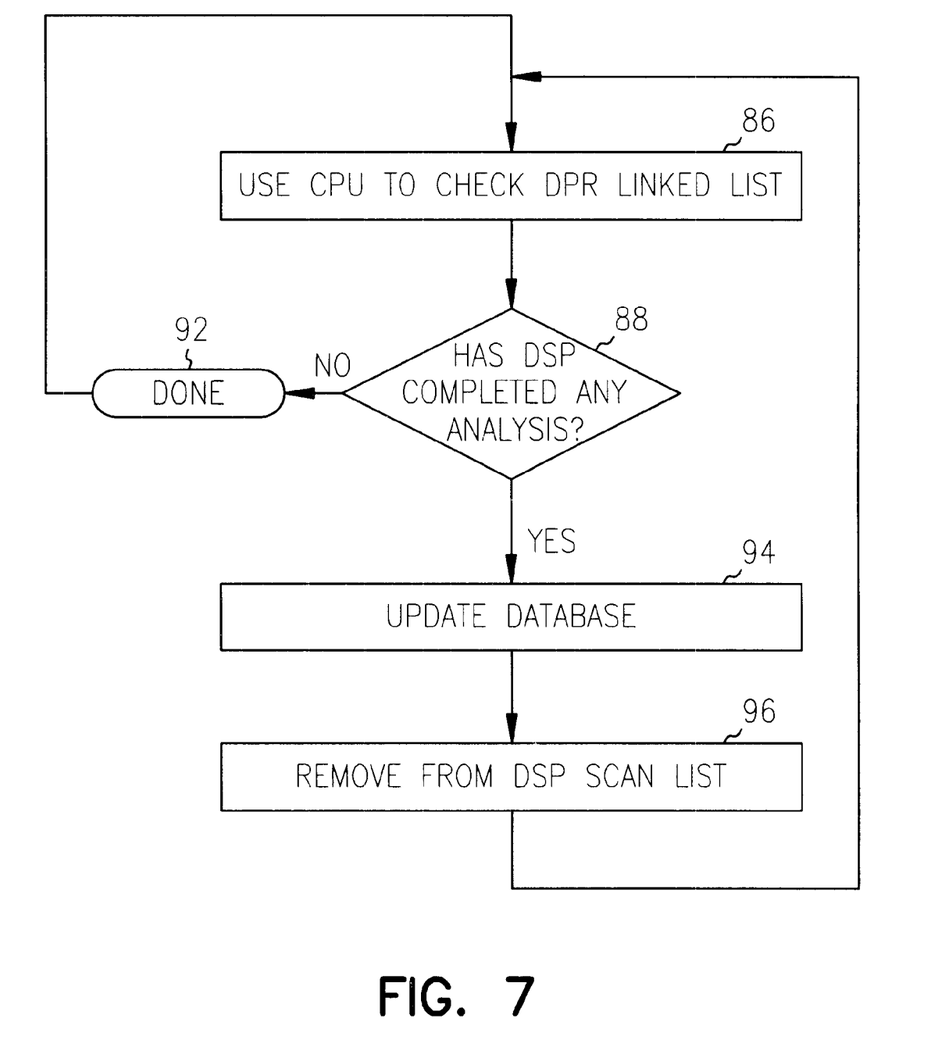
FIG. 7 is a flowchart illustrating operation of the RDT to update a database containing information on system traffic.

As shown in FIG. 7, while the call is in progress, the CPU 36 also analyzes the system periodically, e.g., at every second, to determine if the DSP 34 has completed some analysis at steps 86, 88. In this respect, the CPU 36 analyzes time slot linked list 51 in the DPR 38 in a round robin basis (as indicated by the arrows 90). If no changes have been made since the previous time period, the CPU analysis for this time period ends at 92. If some change has been made, then the database is updated at 94 and the item is removed from the linked list and the DSP scan list at 96.

The system preferably includes a craft interface 106 (shown, e.g., in FIG. 2), through which it can be programmed to perform selective signal compression. For instance, the system can be set up to assure that no compression takes place for any call made by a particular subscriber. In this case, all the subscriber's calls will be assigned the default bandwidth (preferably 64 kbps). A subscriber can also specify an unacceptable level of service, e.g., that no call will be assigned a bandwidth less than 32 kbps. The system can also be programmed to provide substantially greater compression, e.g., to 16 kbps, to ensure emergency service during periods of heavy usage.

The system can use two craft interface options: a menu-driven interface and a Windows based graphical user interface (GUI). The menu-driven interface can be used to access the system from any CDT or RDT with a dumb terminal, a personal computer (PC) with emulation software, or a modem. The GUI can also be used to access the system from any CDT or RDT with a PC preferably operating with Windows 95.™ The craft interface function facilitates system administration, maintenance, provisioning, and testing.

Figure 8A:
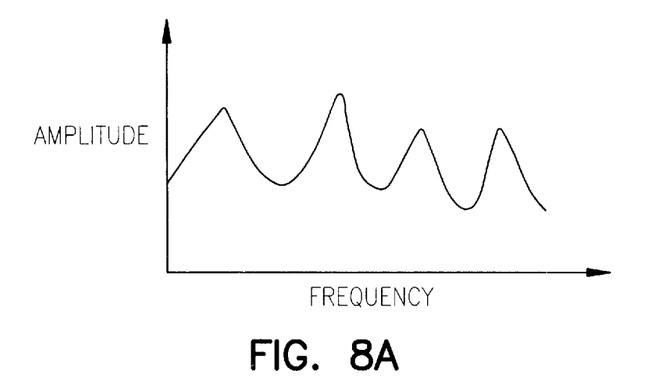
FIGS. 8A–8C are graphs illustrating use of an algorithm template to distinguish between voice and data signals.
Figure 8B:
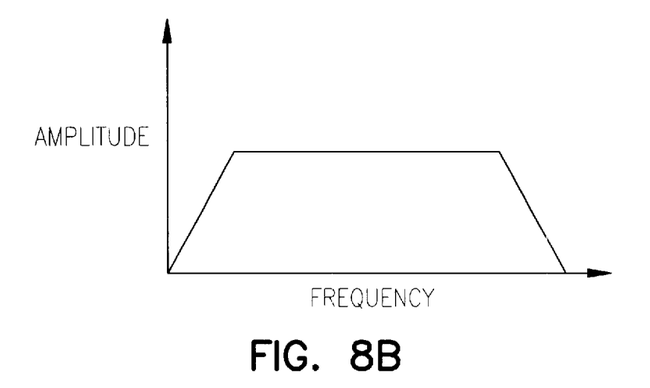
Figure 8C:
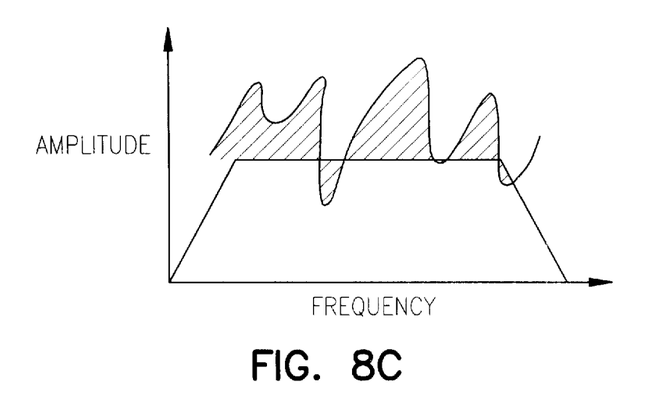

FIGS. 8A–8C are graphs illustrating use of a filtering algorithm to distinguish between voice and data calls. FIGS. 8A and 8B show generalized exemplary voice and data signals, respectively. As shown, the data signal has a substantially steady amplitude over a given frequency range compared to the fluctuating voice frequency signal. As shown in FIG. 8C, the algorithm overlays a sample signal on a data signal template. The error or difference between the signals (shown shaded) is then normalized and analyzed to determine whether it exceeds a given value. If so, the signal is identified as a voice signal. If not, the signal is identified as data.

Figure 9:
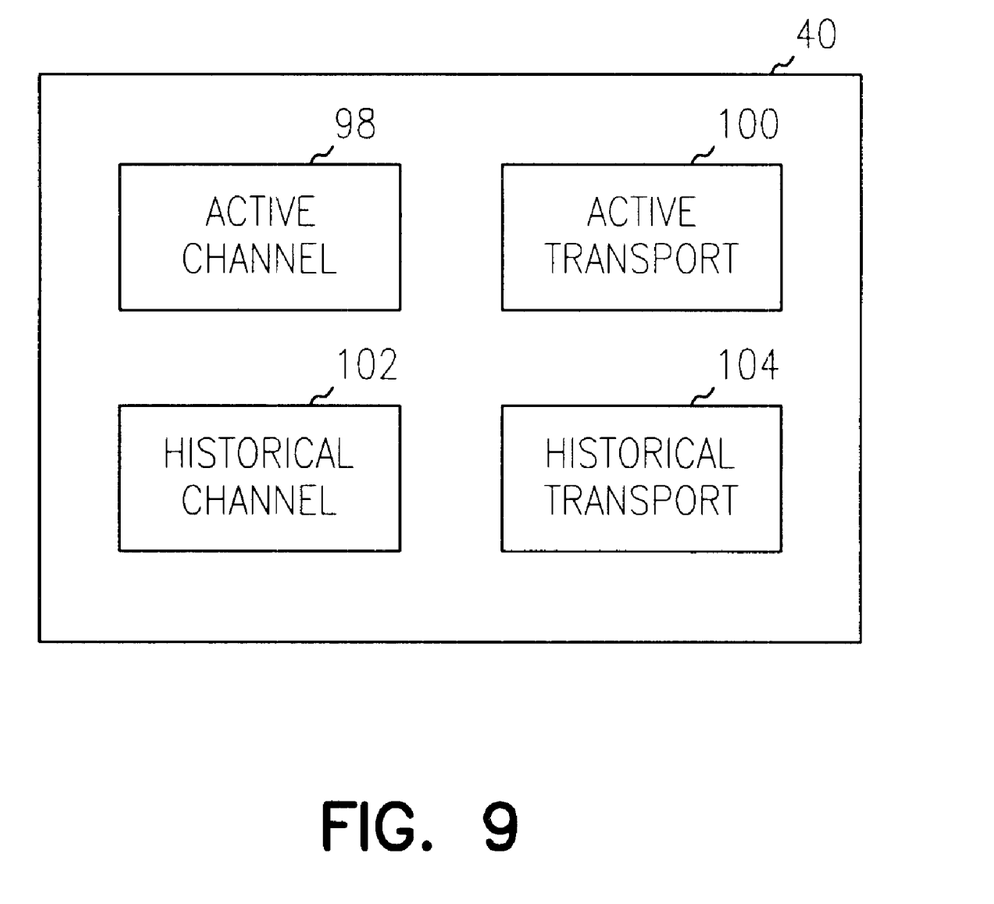
FIG. 9 is a block diagram of the database used for storing data on system traffic.

The database 40 allows customers, i.e., operators of the DLC systems, to compile data on subscriber use of the system. The database 40 preferably is stored in non-volatile memory. Accordingly, information will not be lost if the card containing the memory is pulled out of the unit or if there is a power outage. The database 40 is preferably periodically backed-up to a remotely located main database (not shown).

As shown in FIG. 9, the database 40 preferably is subdivided into an active channel database 98, an active transport database 100, a historical channel database 102, and a historical transport database 104.

The channel databases 98, 102 preferably contain per channel data including information on:
 the number of calls at each service level;
 the number of voice calls;
 the number of data calls;
 the lowest order of service;
 the number of call minutes;
 the number of average call minutes;
 the number of blocked calls when system capacity is exceeded; and
 customer options.

The transport databases 100, 104 preferably contain transport card data including information on:
 the number of maximum time slots assigned;
 the number of blocked seconds;
 the minimum service level duration;
 customer options;
 the number of service level alarms activated when service level reaches a given bandwidth;
 average call duration;
 average number of active calls; and
 the channel/time slot ratio.

According to the present invention, any suitable statistical method may be used to analyze collected data. Known statistical methods include, without limitation, pattern matching algorithms, fuzzy logic algorithms, an adaptive inference engine having a set of learning rules, and other known or later-developed statistical evaluation routines. The particular routine is preferably implemented in software running on a computer connected to the craft input 106. While a statistical analysis on the data is the preferred, one of ordinary skill will appreciate that deterministic analysis techniques can also be used. All such variations are within the scope of this invention.

The data collected by the system can be used by customers for network planning to keep track of system demand and needs. The data also can be used to provide incremental revenue. For example, customers can charge subscribers different rates for voice calls and data calls or can charge rates dependent on the amount of bandwidth used for a given call.

It should be noted that the data collection means described herein can be advantageously used in a variety of networks and is not limited to DLC systems.

The DLC system in accordance with the invention thus has numerous advantages. It comprises an advanced network transmission system that significantly increases local loop capacity and allows communications providers to meet increasingly high demands for service and reliability.

The system is economical and flexible, making it ideal both for upgrades to existing networks and for new applications. It adds value to existing DLC systems by maximizing use of existing carrier line infrastructure. It can be expanded quickly and easily, and deployed in a variety of configurations including point-to-point, star, and drop and insert or any combination of these network topologies. The system is designed with redundancy, inter-shelf connectivity, and shared system intelligence.

The system operates on a variety of transport or carrier media including copper (supporting a variety of protocols including MDSL, ADSL, HDSL, and T1), fiber, coax, and wireless. It provides a high pair gain (e.g., 48:1) over a single twisted pair. It also enables a large number (e.g., 44–88) of simultaneous off-hook voice connections per twisted pair.

In addition, the system units furnish higher channel capacity in less space, and are easy to install, use, and maintain.

The system also advantageously provides a means for collecting data on usage to facilitate network planning and costing.

Having thus described our invention, what we claim as new and desire to secure by letters patent is set forth in the following claims:

What is claimed is:

1. A method for managing bandwidth operative in a digital loop carrier system, the system comprising a central digital terminal and a remote digital terminal, wherein each digital terminal includes a transport card hang a given bandwidth capacity, wherein the remote digital terminal further includes a plurality of service cards connected to the transport card of the remote digital terminal, each of the service cards supporting at least a plurality of channels, the method comprising the steps of:
   upon initiation of a fist call, allocating the rest call to a given time slot of the transport cards of the central and remote digital terminals;
   assigning the given time slot a given default bandwidth for each transport card;
   while the first call is in progress, determining whether the first call is voice or data; and
   if the first call is voice, selectively reducing the given default bandwidth allocated to the first call on each transport card, if necessary, to ensure that a second call, initiated while the first call remains in progress, can be assigned the given default bandwidth.

2. The method as described in claim 1 wherein the at least one transport card supports a protocol selected from a group of protocols consisting essentially of ISDN, MDSL, T1, HDSL, ADSL, OC3, OC12 and OC48.

3. The method as described in claim 1 wherein the step of selectively reducing the given default bandwidth includes the steps of:

determining whether assignment of the given default bandwidth to the second call will cause the given bandwidth capacity of the at least one transport card to be exceeded; and
if so, initiating a compression routine to compress the first call to a reduced bandwidth.

4. The method as described in claim 3 wherein the step of initiating a compression routine includes reallocating the first call to a new time slot having the reduced bandwidth.

5. The method as described in claim 4 wherein the step of initiating a compression routine further includes the step of at least momentarily multicasting the first call on the given time slot and the new time slot.

6. A digital loop carrier system comprising:
   a central digital terminal transport card;
   a communications medium
   a remote digital transport card connected by the communications medium;
   a plurality of service cards, a subset of which are connected through the remote digital terminal transport card to the central digital terminal transport card, each transport card having a given bandwidth capacity, each of the service cards supporting at least a plurality of channels; and
   a bandwidth manager comprising:
      means for allocating a first initiated call to a given time slot of the transport cards,
      means for assigning the given time slot a given default bandwidth;
      means for determining whether the call is voice or data while the first call is in progress; and
      means for selectively reducing the given default bandwidth allocated to the first call if the fist call is voice and if reduction is necessary to ensure that a second call initiated, while the first call remains in progress, can be assigned the given default bandwidth.

7. The digital loop carrier system of claim 6 wherein the communications medium comprises a protocol selected from a group of protocols consisting essentially of ISDN, MDSL, T1, HDSL, ADSL, OC3, OC12 and OC48.

8. The digital loop carrier system of claim 6 wherein the means for selectively reducing the given default bandwidth comprise:
   means for determining whether assignment of the given default bandwidth to the second call will cause the given bandwidth capacity of the transport card to be exceeded; and
   means for initiating a compression routine to compress the first call to a reduced bandwidth if the bandwidth capacity of the transport card is exceeded.

9. The digital loop carrier system of claim 8 wherein the means for initiating a compression routine further include means for reallocating the first call to a new time slot.

10. The digital loop carrier system of claim 9 further including means for allocating the second call to the given time slot.

11. A bandwidth manager for use in a digital loop carrier systems, the system comprising a plurality of service cards connectable to at least one transport card having a given bandwidth capacity, each of the service cards supporting at least a plurality of channels, comprising:
   means for allocating a first initiated call to a given time slot of the at least one transport card;
   means for assigning the given time slot a given default bandwidth;

means for determining whether the first call is voice or data while the first call is in progress;

means for determining if a second call, initiated while the first call is in progress, requires the given default bandwidth; and means for selectively reduce the given default bandwidth allocated to the first call if the first call is voice and if the second call requires the given default bandwidth.

12. The bandwidth manager of claim 11 wherein the means for selectively reducing the given default bandwidth comprise:

means for determining whether assignment of the given default bandwidth to the second call will cause the given bandwidth capacity of the transport card to be exceeded; and means for initiating a compression routine to compress the first call to a reduced bandwidth if the bandwidth capacity of the transport card is exceeded.

13. The bandwidth manager of claim 12 wherein the means for initiating compression routine further include means for reallocating the a new time slot having the reduced bandwidth.

14. A terminal for use in a digital loop carrier system, comprising:

a transport card having a given bandwidth capacity connectable to a communications medium;

a service card connected to a transport card, the service card supporting a plurality of subscriber channels; and a bandwidth manager comprising:

means for allocating a first initiated call to a given time slot of a service card;

means for assigning the given time slot a given default bandwidth;

means for determining whether the call is voice or data while the first call is in progress;

means for determining if a second call, initiated while the first call is in progress, requires the given default bandwidth; and means for selectively reducing the given default bandwidth allocated to the first call if the first call is voice and if the second call requires the given default bandwidth.

15. A method for managing bandwidth in a digital loop carrier system, the system comprising a remote digital terminal connected to a plurality of subscriber lines and a central digital terminal connected to a central office of a telecommunications network, said remote digital terminal and said central digital terminal each including at least one service card having a plurality of channels, at least one transport card and circuitry for transferring signals therebetween, said at least one transport card of said remote digital terminal being connected to said at least one transport card of said central digital terminal by a medium having a given bandwidth capacity, the method comprising the steps of:

upon initiation of a first call through one of said subscriber lines, allocating the first call to a time slot of the at least one transport card of said remote digital terminal, said time slot having a given default bandwidth;

while the first call is in progress, determining whether the call comprises a given compressible signal; and if the first call comprises said given compressible signal, selectively reducing the default bandwidth allocated to the first call if necessary to ensure that, if a second call is initiated while the first call remains in progress, said second call can be assigned the given default bandwidth.

16. The method as described in claim 15 wherein the given compressible signal comprises a voice signal.

17. The method as described in claim 15 wherein the given compressible signal comprises a data signal having a given speed.

18. The method as described in claim 15 wherein the medium comprises a carrier line supporting a protocol selected from a group of protocols consisting essentially of ISDN, MDSL, T1, HDSL, ADSL, OC3, OC12, and OC48.

19. The method as described in claim 15 wherein the step of selectively reducing the given default bandwidth includes the steps of:

determining whether assigning of the given default bandwidth to the second call will cause the given bandwidth capacity of the medium to be exceeded; and if so, initiating a compression routine to compress the first call to a reduced bandwidth.

20. The method as described in claim 19 wherein the step of initiating a compression routing further includes the step of reallocating the first call to a new time slot in the at least one transport card of the remote digital terminal.

* * * * *

UNITED STATES PATENT AND TRADEMARK OFFICE
CERTIFICATE OF CORRECTION

PATENT NO. : 6,421,356 B2
DATED : July 16, 2002
INVENTOR(S) : Dan K. Carter, Perry J. Brown and Brian C. Smith It is certified that error appears in the above-identified patent and that said Letters Patent is hereby corrected as shown below:

Column 3,
Line 49, delete "(DSR) 38," and insert -- (DPR) 38, --, therefor.

Column 7,
Line 43, delete "hang" and insert -- having --, therefor.
Line 49, delete "fist" and insert -- first --, therefor.
Line 49, delete "rest" and insert -- first --, therefor.

Column 8,
Line 16, insert -- ; -- after "medium".
Line 34, delete "fist" and insert -- first --, therefor.
Line 60, delete "systems" and insert -- system --, therefor.

Column 9,
Line 7, delete "reduce the" and insert -- reducing --, therefor.
Line 22, insert -- first call to -- between "reallocating the" and "a new time".

Signed and Sealed this

Fifth Day of August, 2003

JAMES E. ROGAN
*Director of the United States Patent and Trademark Office*